(No Model.) 2 Sheets—Sheet 1.

T. P. COOMBS.
ROTARY ENGINE.

No. 336,896. Patented Mar. 2, 1886.

Witnesses.
Milan F. Stevens.
Conrad Reno.

Inventor.
Thomas P. Coombs,
by Wm A. Macleod
his Atty (No Model.) 2 Sheets—Sheet 2.
T. P. COOMBS.
ROTARY ENGINE.
No. 336,896. Patented Mar. 2, 1886.
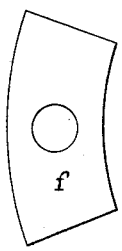
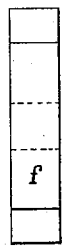
Fig. 8.   Fig. 9.
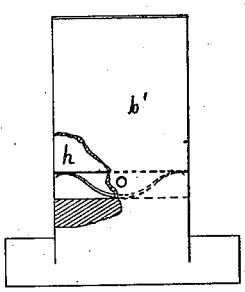
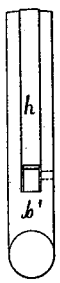
Fig. 6.   Fig. 7.
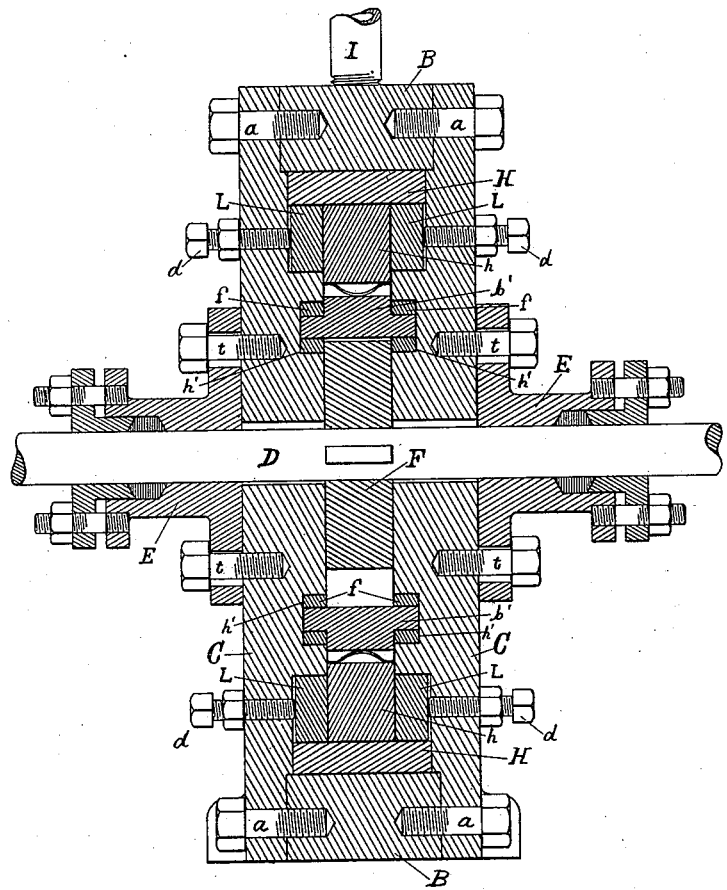
Fig. 3.
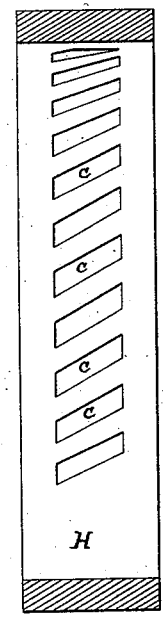
Fig. 5.
Witnesses.
Milan F. Stevens
Conrad Reno
Inventor.
Thomas P. Coombs,
by Wm A. Macleod
his atty
N. PETERS, Photo-Lithographer, Washington, D. C.

UNITED STATES PATENT OFFICE.

THOMAS P. COOMBS, OF WOBURN, MASSACHUSETTS, ASSIGNOR OF ONE-HALF TO GEORGE E. BROWN, OF SAME PLACE.

ROTARY ENGINE.

SPECIFICATION forming part of Letters Patent No. 336,896, dated March 2, 1886.

Application filed August 5, 1885. Serial No. 173,581. (No model.)

*To all whom it may concern:*

Be it known that I, THOMAS P. COOMBS, of Woburn, county of Middlesex, State of Massachusetts, have invented certain new and useful Improvements in Rotary Engines, of which the following is a specification, taken in connection with the drawings accompanying and forming a part hereof, in which—

Figure 2:
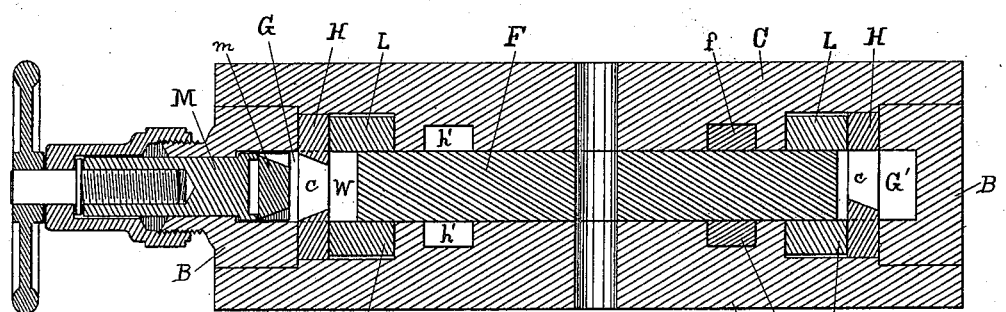
Figure 4:
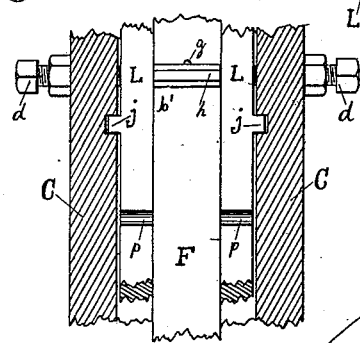
Figure 1:
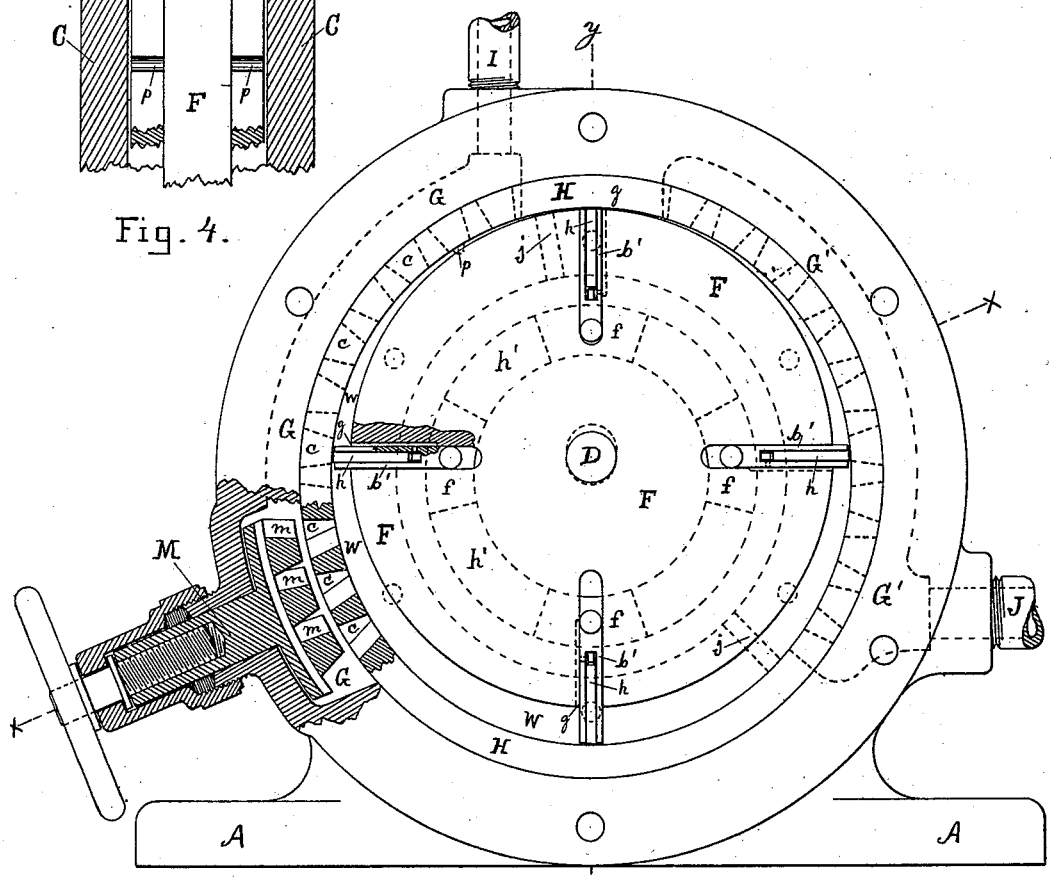

Figure 1 is a side elevation, with the outlines of the interior parts indicated by dotted lines. Fig. 2 is a section on line $x\,x$, Fig. 1. Fig. 3 is a section on line $y\,y$, Fig. 1. Figs. 4, 5, 6, 7, 8, and 9 are details.

The object of my invention is the construction of a rotary steam-engine which shall combine compactness and economy with a maximum degree of power; and it consists in the peculiarities of construction hereinafter more particularly described.

Like letters of reference indicate like parts throughout the drawings.

A is a bed, upon which rests the cylindrical case or drum, which consists of the cylinder B and its heads C, which are bolted to the cylinder by screw-bolts, as shown at $a\,a$, Fig. 3.

D is the main shaft, which passes eccentrically through the case at $b$, Fig. 1, and is provided with suitable bearings, E, bolted at either side to the cylinder-heads. Inside the cylinder is the disk F, which is keyed to the main shaft, and the periphery of which is eccentric to the interior of the cylinder. The ring B is cut away throughout a portion of its interior to form the curved spaces or steam-chests G G', the chest G for the live steam from the inlet I, and the chest G' for the exhaust, the latter being connected with the outlet J.

Within the ring B, and bearing on it between the steam-spaces G G', is the ring H, which is provided with a series of oblique slots $c\,c$. (See Fig. 5.) These slots $c\,c$ are oblique or diagonal to the circumference or the inner face of the said ring, and permit of the passage of live steam from the chamber G to the space $w$, directly outside the disk F, which is traversed by the pistons $b'$, and on the exhaust side of the drum they permit the passage of the exhaust-steam in the opposite direction into the chamber G'. The rings L L, concentric with the drum or cylinder, are placed on either side of the periphery of the disk F, as shown, Figs. 2 and 3, and may be set closely against the disk by means of the screws $d\,d$. These rings act as a packing for the disk, and are let into the inner faces of the cylinder-heads. Projections $j$ on the rings, (see Fig. 4,) which fit corresponding grooves in the cylinder-heads, prevent the rings from turning with the disk. The pistons $b'$, preferably four in number, arranged at points equidistant on the disk, are of the shape shown, Figs. 6 and 7. The trunnions of the pistons are set in bearings in the curved blocks $f\,f$. (Shown in detail, Figs. 8 and 9.) These blocks slide in pathways $h'$, adapted to receive them, cut in the cylinder-heads, (see Figs. 2 and 3,) and which are concentric with the cylinder. The pistons project outward in slots cut radially in the disk, and are provided centrally (see Figs. 6 and 7) with suitable packing, $h$, which rests on a spring, $s$, at the bottom of the packing-chamber, in order that there may be a space underneath. This space is connected with the steam-chamber G by a small groove, $g$, (see Fig. 4,) in the disk beside the piston, which permits the steam to get behind the piston-packing, and thus force it out against the ring H.

A convenient form of cut-off is shown at Fig. 1, with the surrounding parts broken away. It consists of a shank, M, projecting through the cylinder into the steam-chest, and suitably packed and provided with means for moving it outward or inward. Its inner end is provided with plugs $m\,m$, of a size and shape to fill the slots $c\,c$ in the ring H. It will be obvious that if these plugs be forced into the slots which are opposite them, thereby closing these slots, which are a part only of the series of slots, the pistons will "cut off" sooner than if the slots are all open. The number of plugs may of course be varied as desired. The grooves $p\,p$, Figs. 1 and 4, across the packing-rings, permit steam to pass from the chamber G to the small space between the rings and the cylinder ends, (see Figs. 2 and 4,) thus forming a cushion or layer of steam around the rings and effecting a balance of the parts by equalizing the pressure of the steam in the space shown at $w$, Fig. 2. This space $w$ extends from the upper tongue, $j$, (see Fig.

1,) around the live-steam side of the disk F to the exhaust.

In order to equalize the wear on the ends of the piston-packings, resulting from their rubbing contact with the ring H, the slots c c of the ring are cut obliquely, thus bringing all parts of the end of the packing constantly in contact with the ring. As will be obvious, however, the inner surface of the ring will be worn down slightly after continued use, and in order to keep the piston-packing in contact with the ring at its highest point just before it comes in contact with the live steam it may be necessary to move the disk up within the cylinder. This may be done by loosening the bolts t t and raising the shaft and its bearings E and the disk F, allowance being made around the shaft in the cylinder-heads and in the bolt-holes of the pieces E to permit of this, as shown, Fig. 3.

The operation of the machine is as follows: Steam is admitted at I, filling the chamber G and passing through the slots c c to the space w behind the pistons. The steam then acts directly upon the piston until the succeeding piston has passed the cut-off point, after which the piston is under pressure, from the expansion of the steam directly behind it, until it passes the first opening to the exhaust-chamber. The pistons are moved outward, so that their ends project into the space w, and backward again on the exhaust side until their ends are flush with the periphery of the disk, by the piston-blocks f, which are forced to slide in the pathways h', which are concentric with the cylinder, and consequently approach nearer to the periphery of the disk at one portion than at another.

What I claim is—

1. In a rotary engine, the combination, with the radially-movable pistons, of the ring H, against the inner face of which the packings of the said pistons impinge, the said ring being formed separate from the casing, and provided with ingress and egress slots c, which are oblique or diagonal to the inner face of the said ring, and to the lengths of the ends of the packings of the pistons, whereby the wear of the said packings against said ring is equalized, substantially as set forth.

2. In a rotary engine, the combination, with the cylindrical casing B, the ring H, the piston-disk F, and the radially-movable pistons carried by the said disk, of the heads C, having annular recesses on their inner faces, and the packing-rings arranged in the said recesses opposite the outer portion of the piston-disk and the ends of the pistons, said rings having projections j, fitting in grooves in said heads, substantially as set forth.

3. The combination, in a rotary engine, of a cylindrical case cut away interiorly to form a steam-chamber, the slotted ring H, and the plugs m m, for the purposes and substantially as described.

THOMAS P. COOMBS.

Witnesses:
WM. A. MACLEOD,
M. A. THOMPSON.